(12) United States Patent
Dainelli (10) Patent No.: US 10,633,878 B2
(45) Date of Patent: Apr. 28, 2020

(54) CHEMICAL TOILET CABIN

(71) Applicant: Alessio Dainelli, San Gimignano (IT)

(72) Inventor: Alessio Dainelli, San Gimignano (IT)

( * ) Notice: Subject to any disclaimer, the term of this patent is extended or adjusted under 35 U.S.C. 154(b) by 73 days.

(21) Appl. No.: 16/078,523

(22) PCT Filed: Feb. 28, 2017

(86) PCT No.: PCT/IB2017/051169
§ 371 (c)(1),
(2) Date: Aug. 21, 2018

(87) PCT Pub. No.: WO2017/149454
PCT Pub. Date: Sep. 8, 2017

(65) Prior Publication Data
US 2019/0055744 A1 Feb. 21, 2019

(30) Foreign Application Priority Data

Feb. 29, 2016 (IT) ......................... 102016000021095

(51) Int. Cl.
| | |
|---|---|
| *E04H 1/12* | (2006.01) |
| *F16B 2/18* | (2006.01) |
| *F16B 5/06* | (2006.01) |
| *E04B 1/343* | (2006.01) |
| *E04B 1/344* | (2006.01) |
| *E04B 1/32* | (2006.01) |

(52) U.S. Cl.
CPC ......... *E04H 1/1216* (2013.01); *E04B 1/3442* (2013.01); *E04B 1/34321* (2013.01); *F16B 2/185* (2013.01); *F16B 5/0614* (2013.01); *E04B 2001/3276* (2013.01); *Y02A 50/456* (2018.01)

(58) Field of Classification Search
CPC . E04H 1/1216; E04B 1/34321; E04B 1/3442; F16B 2/185; F16B 5/0614
USPC ............................................................ 4/459
See application file for complete search history.

(56) References Cited

U.S. PATENT DOCUMENTS

| | | |
|---|---|---|
| 3,744,205 A | 7/1973 | Moss |
| 4,744,111 A | 5/1988 | Tegg et al. |
| 2013/0291449 A1 | 11/2013 | Strickland et al. |

FOREIGN PATENT DOCUMENTS

| | | |
|---|---|---|
| DE | 90 16 416 U1 | 2/1991 |
| DE | 41 00 737 C1 | 4/1992 |
| DE | 197 07 625 A1 | 8/1998 |
| EP | 0 852 278 A1 | 7/1998 |
| EP | 2 757 297 A2 | 7/2014 |
| WO | 02/02883 A1 | 1/2002 |

OTHER PUBLICATIONS

International Search Report and Written Opinion of the International Searching Authority for corresponding International Patent Application No. PCT/IB2017/051169 dated Aug. 4, 2017, 17 pages.

*Primary Examiner* — Christine J Skubinna
(74) *Attorney, Agent, or Firm* — Merchant & Gould P.C.

(57) ABSTRACT

A chemical toilet cabin includes a platform (3), vertical side walls (4, 5, 6, 7) connected to the platform, and a roof (8) connected to the walls. Reversible joint connectors (9, 10, 11, 12, 21, 22) are along the edges of the walls and on the opposed faces of the platform and the roof to removably join each wall to the walls adjacent thereto, the platform and the roof. A reversible lock (13, 14, 15) for the joint connectors are provided arranged between each wall and the adjacent walls and between each wall and the platform and the roof.

11 Claims, 8 Drawing Sheets

CHEMICAL TOILET CABIN

This application is a National Stage Application of PCT/IB2017/051169, filed 28 Feb. 2017, which claims benefit of patent application Ser. No. 102016000021095, filed 29 Feb. 2016 in Italy and which applications are incorporated herein by reference. To the extent appropriate, a claim of priority is made to each of the above-disclosed applications.

TECHNICAL FIELD

The present invention relates to a portable toilet cabin. More particularly, the invention relates to a knock-down cabin of a portable chemical toilet that can be assembled and disassembled in a simple and quick way.

PRIOR ART

As is known, a portable toilet is a sanitary appliance in which a chemical agent is used for bowl sanitising after each use. The portable toilet (in the following, referred to as chemical toilet) finds application in all the circumstances where a sewer system is not available for discharging bodily wastes, which, instead, are collected in a reservoir the toilet is equipped with. Another very common use of a chemical toilet is in construction sites as well as in events, shows and outdoor entertainments and the like, and in this case the chemical toilet consists of a cabin, which is portable and arranged for temporary installation, in which the bowl and the waste material collection reservoir, the reservoir for a sanitising chemical agent, and possibly an hand basin, an urinal, and a clean water reservoir are provided together with any other supplementary device that may be necessary for its use or dictated by local regulations and/or use standards.

The cabin comprises several components made of plastic material, polyethylene for example, manufactured by moulding, assembled and joined to one another by riveting. More precisely, the cabin comprises a base, a platform and a "basin" fixed to the base, said basin being the tank intended for holding waste matter and having an opening equipped with a we seat and cleaning/sanitizing devices. Four side walls are fixed vertically to the platform, which is generally quadrilateral in shape, by means of rivets; one of these walls comprises an access door and said walls are joined to one another by riveting. A roof is mounted at the top and is also joined to upper edges of said side walls by means of rivets.

Currently, the above described assembling operations are carried out at the factory once and for all, i.e. the cabin comes out of the factory in its final configuration and is ready to be transported to a place of use. Due to their size, the number of cabins that can be transported by a conventional truck is rather limited and this creates significant problems affecting the operating costs of the service, which generally involves even frequent handling of the cabins from a pace of use to another or their transport to storage.

Furthermore, the assembling operation of the prior art portable toilet cabins is time-consuming and laboursome. The platform is provided with a substantially L-shaped side abutment wall along its edge. Each cabin wall must be leant on the short side of the L-shaped wall with its lower edge such that the long side of the L-shaped wall leans against the face of the cabin wall to allow the platform to be connected to the cabin wall by a row of rivets. The vertical walls of the cabin are then joined to each other by vertical rows of rivets at the cabin vertical edges.

In addition to the assembling difficulties, the connection between the cabin platform and the side walls has a limited strength over time. As a matter of fact, after some time many cabins start exhibiting problems with wall breakaway from the platform perimeter due to the fact that they are simply leant against the platform. During loading and unloading operation, in fact, the cabins undergo high stress up to a domino effect triggers. The wall oscillations move the rivets at the base which in turn start to make oval the rivet seats. With the continued effect, the rivets do not withstand and the wall break away from the platform.

Several solutions for knock-down chemical toilet cabins have been proposed in the past. However, none of them was successful commercially due to a number of drawbacks they exhibited.

DE 19707625 filed on Feb. 26, 1997 discloses a chemical toilet cabin comprising a base, a roof, side walls and edge uprights joining the base, the roof and the side walls to each other. The edge uprights are provided with connection elements engaging with corresponding grooves formed at the corners of the base and the roof. The side walls abut against the edge uprights and engage with corresponding grooves formed along the sides of the base and the roof. The edge uprights are fixed to the base and the roof by bolts. The presence of interlocking connections among the base, the roof and the side walls makes the positioning of these components easier when assembling the cabin, but, once mounted, the cabin exhibit the above mentioned drawbacks, i.e., high handling costs for transporting the cabin and limited mechanical strength over time. Furthermore, the need for using edge uprights results in higher plant and production costs with respect to the chemical toilet cabins with a conventional structure and therefore, as a last result, an higher purchase cost to be borne by the service operator.

U.S. Pat. No. 4,744,111 filed on Jun. 26, 1986 discloses a knock-down structure of chemical toilet comprising a base, a roof, and side, front and back walls. Each side wall is provided with slots at the lower portion thereof which engage corresponding tongues extending from the base to detachably secure the vertical walls to the base. Edge uprights rise from the base and a plurality of pins extend from each upright, said pins engaging with slots formed on adjacent vertical edges of a pair of adjacent vertical walls to releasably join the walls to each other. Finally, each vertical wall is provided with a plurality of pivotable cam latches along an upper edge portion of the walls engaging with slots formed on the roof to releasably join the vertical walls to the roof. The chemical toilet cabin structure described in this document entails a complex system to ensure a reversible connection of the components thereof. In addition to requiring edge uprights in this case too, the cabin requires even three different systems to join the vertical walls to the base, the roof and the edge uprights, respectively. Furthermore, the presence of three different joining systems makes the production of the vertical walls very complicated and expensive and at least two operators are required to carry out the assembling of the structure. Finally, the connections of the walls to the base, the roof and the uprights have a certain play and do not ensure the necessary stiffness to provide the structure with the required stability.

WO 0202883 filed on Jul. 4, 2001 discloses a set of plates usable to constitute the walls of a container or a cabin. The walls can be joined to each other through mutually engageable profiles formed along the vertical edges thereof and an edge upright arranged therebetween. Cam latch means are provided to tighten the connection among the walls. The side walls are joined to the base and the roof walls by screws or rivets, whereby the cabin made with the plates according to this patent is not of the knock-down type. Moreover, due to the lot of components required to connect the plates to each other, the solution according to this patent is complex and expensive.

Therefore, a need remains in the field of chemical toilet cabins to make available a chemical toiled cabin that is of the knock-down type, is featured by an high mechanical stability one mounted, is easy to be mounted and dismounted, and featured by very low production and handling costs. More precisely, in order that a knock-down a chemical toilet cabin can be accepted by the market, it must satisfy several requirements at the same time.

First, the cabin must be able to be mounted by a single operator in a safe and autonomous manner on a significantly reduced time with respect to the mounting with rivets of a conventional chemical toilet cabin. Furthermore, once mounted, the cabin must result in a substantially monolithical structure and must ensure due privacy to users, by avoiding the lock systems to be actuated by unauthorized persons, and in fact making the disconnection of the components from one another impossible.

Secondly, it is desirable that cabin dismounting be carried out by a single operator autonomously and in the same, easy and quick way as the mounting operation. Furthermore, it is desirable that the operator have at hand means for orderly arranging all the cabin dismounted components to be able to transport them through the conventional vehicles used for the maintenance of the chemical toilets.

Third, it must be possible to maximise the number of dismounted cabins that can be packaged together in the same space occupied by a single cabin so as to dramatically reduce the costs involved with the transport of preassembled cabins, this being also beneficial from the point of view of the environmental protection.

DISCLOSURE OF THE INVENTION

The general object of the present invention is to provide a chemical toilet cabin that obviates to the above mentioned problems and drawbacks of the prior art chemical toilet cabins.

An important particular object of the present invention is to provide a chemical toilet cabin of the above mentioned type having a knock-down structure capable of satisfying all the above mentioned needs.

A particular object of the present invention is to provide a chemical toilet cabin of the above mentioned type with such a structure that makes it possible the direct assembling at the place of use and the dismounting at the end of period of use, thereby allowing the cabin to be transported to another place of use or to warehouse in a quick and easy way and without requiring the use of rivets for the connection of its components.

Another object of the present invention is to provide a chemical toilet cabin of the above mentioned type, wherein the mutual connection of the side walls to one another, to the platform and the cabin roof is more stable and resistant to mechanical stresses over time with respect to similar known cabins.

Another object of the present invention is to provide a chemical toilet cabin of the above mentioned type in which the assembling is made easier and quicker with respect to similar cabins of the known type.

Another object of the present invention is to provide a chemical toilet cabin of the above mentioned type which is made up of a minimum number of components so as to reduce the cost thereof and make simpler the assembling, dismounting and handling operations.

Another object of the present invention is to provide a chemical toilet cabin of the above mentioned type which, thanks to the reduction of weight of the parts to be handled, makes loading and unloading operation effortless and allows for labour cost to be reduced.

A further object of the present invention is to provide a chemical toilet cabin of the above mentioned type, which also allows for the transportation costs to be reduced, thanks to a compact packaging of several cabins in a dismounted condition. Thus, another important object of the present invention is to provide a system which makes easier and less expensive the managing of handling and transport of chemical toilet cabins.

According to an important feature of the invention, the chemical toilet cabin comprises:
 a platform, vertical side walls and a roof,
 reversible joint connection means formed along the edges of said side walls and on opposed faces of said platform and said roof to amovably join each side wall to the side walls adjacent thereof, to the platform and to the roof,
 reversible locking means of said joint connection arranged between a side wall and the adjacent wall and between each of said side walls and said platform and said roof,
 said side walls have vertical edges and side wall portions adjacent to said vertical edges that are rounded in such a way to form a rounded edge of the cabin when two side walls are paired to each other;
 vertical edges delimiting said rounded portions of said side walls are shaped with matching profiles of the male-female type between a wall and the adjacent wall making up said joint connection means between adjacent walls;
 each of said reversible locking means of said joint connection means provided between two adjacent side walls comprises a lever lock comprising an articulated system formed by a first arm with a hook-shaped end and a second arm lying in a plane perpendicular to said two adjacent side walls and pivotally connected to said first arm and to a rounded portion of one of said adjacent side walls about axes perpendicular to said plane;
 the hook-shaped end of said first arm being engaged with a tooth formed on a rounded portion of the other of said two adjacent side walls in a tightened condition when the second arm is rotated beyond a dead centre of the articulated system.

According to another particular embodiment of the invention, the first arm has the same rounded profile as the rounded portions of said side walls and on the rounded portion of each side wall there is formed a seat for housing the first arm and the second arm, when the hook-shaped end is tightened against said tooth, in such a way that the first arm is substantially flush with an outer face of the respective rounded portion and in such a way to contain the second arm rotated beyond the dead centre of the articulated system. In this way, it is possible to quickly stabilize all the chemical toilet cabin components by simply tightening the lever locks without any protruding part from the outer surface of the cabin.

According to another important feature of the invention, the shape and the dimensions of the chemical toilet cabin are designed in such a way to allow more cabins to be packaged in a compact form, requiring a total pack volume slightly greater to that of only one cabin.

BRIEF DESCRIPTION OF THE DRAWINGS

The above and other features, as well as the and advantages, of the chemical toilet cabin according to the present invention will be apparent from the following description of an exemplifying, non-limiting embodiment thereof with reference to the attached drawings, in which.

EMBODIMENTS OF THE INVENTION

Figure 1:
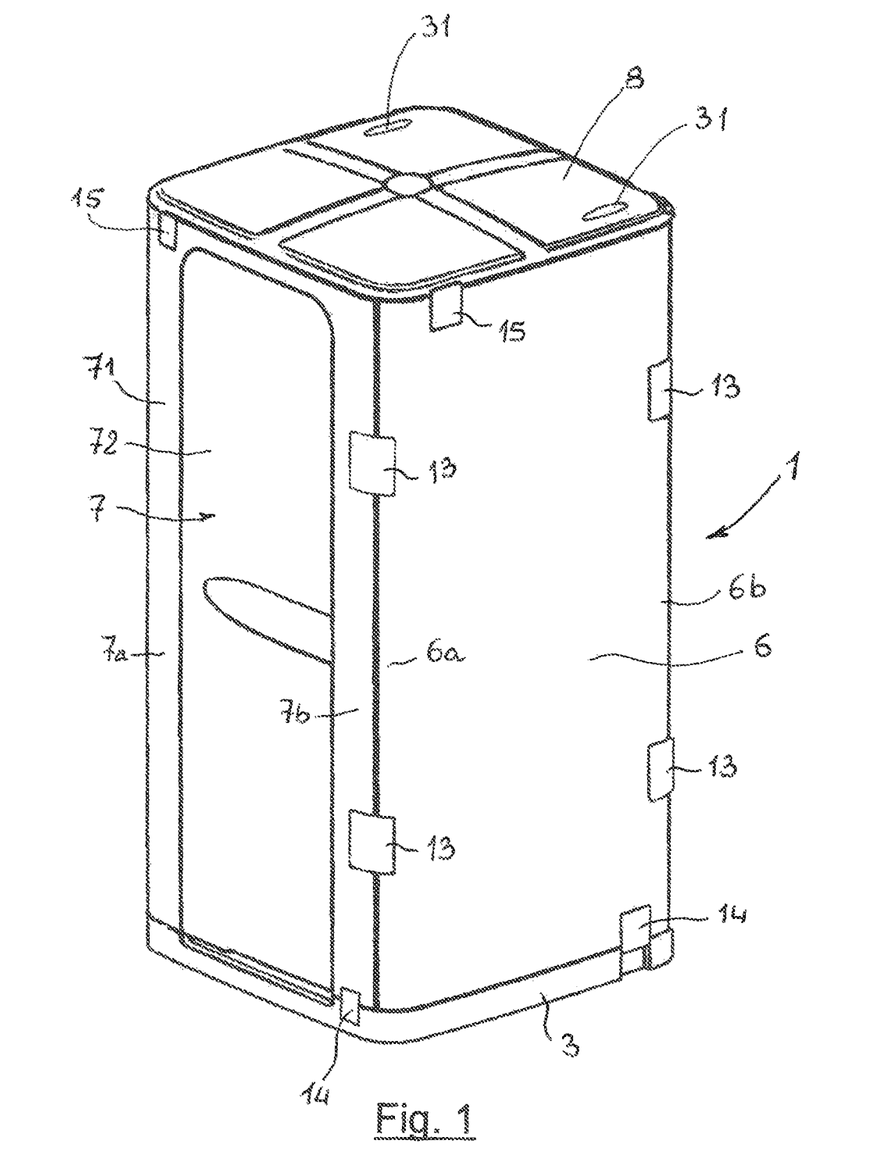
FIG. 1 is a top perspective view of a chemical toilet cabin according to the present invention.
Figure 2:
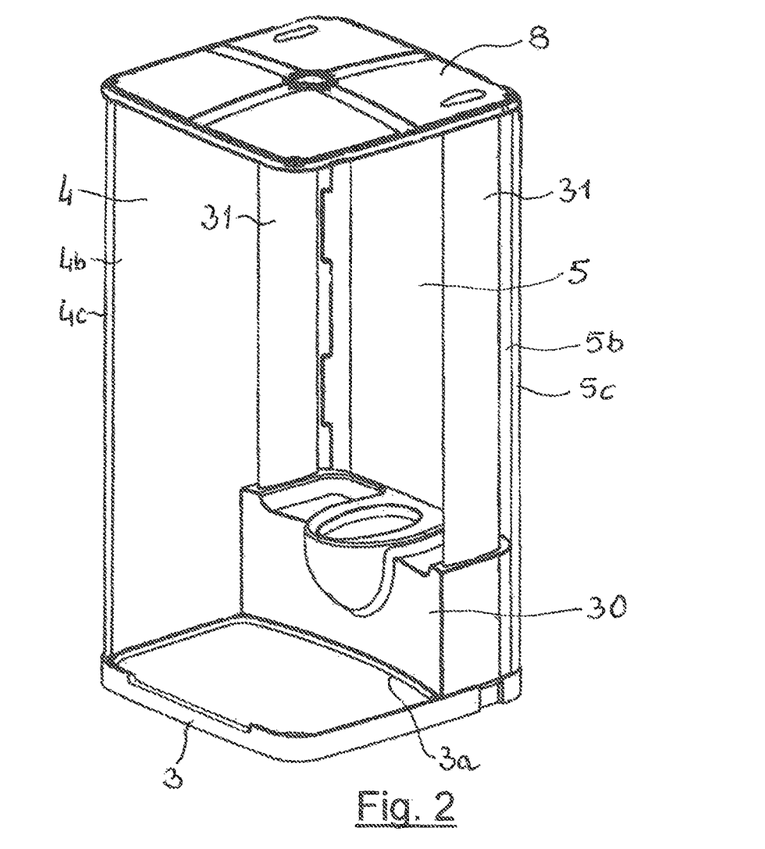
FIG. 2 is an exploded perspective view of the cabin of FIG. 1.

With reference to FIGS. 1 and 2, it has generally indicated at 1 a chemical toilet cabin according to the invention. Cabin 1 comprises a bottom platform 3 on which a seat 3a is formed for hosing the bottom portion of a waste collection tank with relevant opening and we seat, indicated at 30 as a whole. From platform 3 there extend three vertical walls 4, 5 and 6, that are consecutive and arranged at 90° from one another and a fourth wall 7 substantially formed by a frame 71 and a cabin access door 72 mounted therein. Frame 71 is fixed to two respective sides of two opposite walls (walls 4 and 6 in the example shown in the figures). At the top side of the cabin a roof 8 is placed which is fixed to the upper edges of vertical walls 4, 5 and 6 and frame 71. As in the known art, the above described components are fully made by moulding in plastic material, for example polyethylene.

Side walls 4, 5, 6, 7 are mostly flat in shape, and at the respective vertical edges 4a,b; 5a,b; 6a,b; 7a,b they have respective rounded portions 4c, 5c, 6c, 7c extending to the same part of the respective side wall adjacent to said vertical edges to form a rounded edge 1a of the cabin when two side walls are joined to each other.

Figure 3:
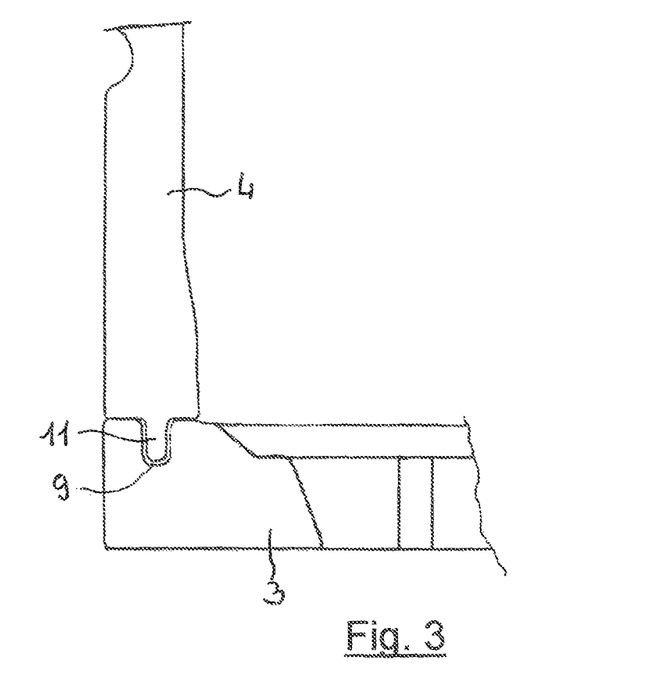
FIG. 3 is a schematic cross-sectional view of a portion of the cabin of FIG. 1 showing the connection between roof and a wall thereof.
Figure 4:
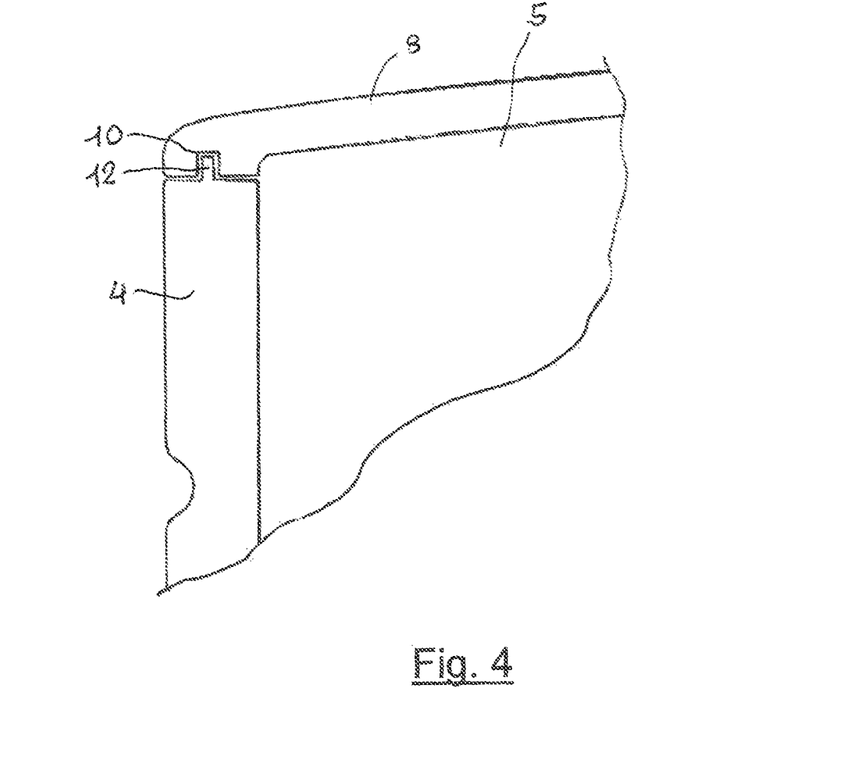
FIG. 4 is a schematic cross-sectional view of a portion of the cabin of FIG. 1 showing the connection between bottom platform and a wall thereof.

As shown in FIGS. 3 and 4, platform 3 and roof 8 are connected to side walls 4, 5, 6, 7 by reversible joint connections. In particular, in the present embodiment the joint connections are of the male-female type and are formed by grooves 9 and 10, perimetrically formed on the inner faces, i.e. facing to each other, of platform 3 and roof 8, respectively, and by corresponding ribs 11 and 12 extending along the lower and upper edges of side walls 4, 5, 6, 7, in particular of frame 71, respectively, for engaging in corresponding grooves 9 and 10. When ribs 11 and 12 are engaged in respective perimetrical grooves 9 and 10, upper and lower edges of side walls 4, 5, 6 and frame 71 abut against inner faces of platform 3 and roof 9 along grooves 9 and 10.

The connection among walls 4, 5, 6, 7, and platform 3 and roof 8 is reversible, this meaning that ribs 11 and 12 can be engaged with, and disengaged from respective grooves 9 and 10 and in this way the walls can be separated from the platform and the roof and the cabin can be break down into its components once it may be required.

Grooves 9 and 10 and, correspondingly, ribs 11 and 12 may either extend continuously along the inner faces of platform 3 and roof 8 and edges of walls 4, 5, 6, 7 or they can be discontinuous.

Furthermore, in order to make the joint connection stable among these components, walls 4, 5, 6, 7 are locked two by two, at two respective adjacent vertical sides and, respectively, to platform 3 and roof 8, through joint connection locking means, made of plastic material and made up, in the present embodiment of the invention, by lever locks 13 placed between two adjacent walls, lever locks 14 placed between each wall and the platform and lever locks 15 placed between each wall and the roof of the cabin.

Figure 5:
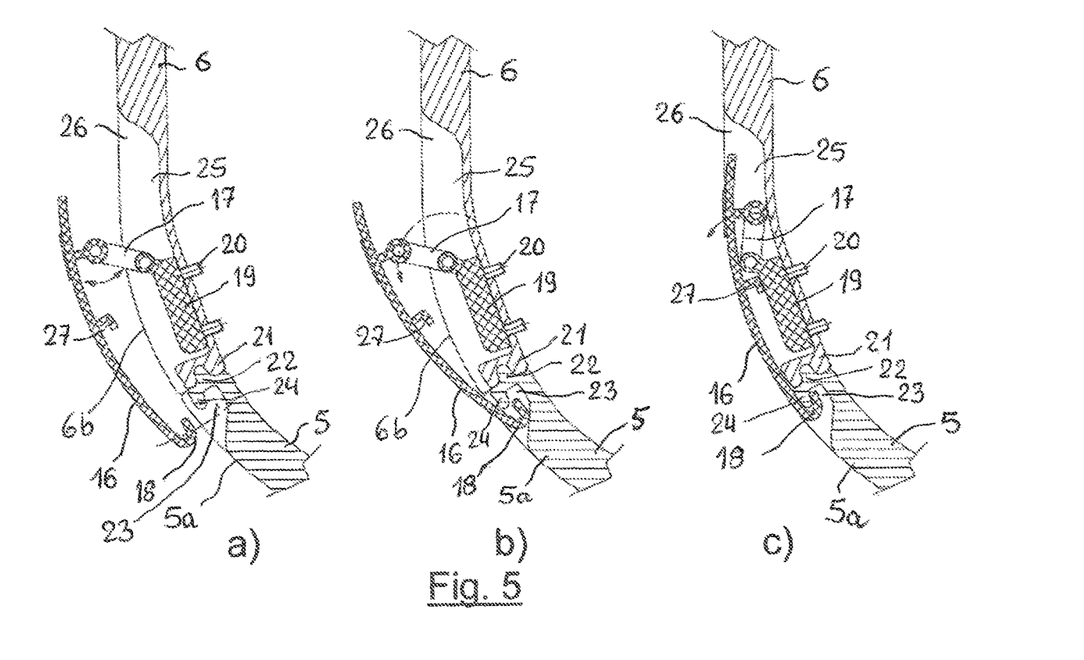
FIG. 5 is a detailed cross-sectional view showing a horizontal locking member of the connection between two adjacent walls in the cabin of FIG. 1 in a) open, b) hooking, and c) closed condition.
Figure 6:
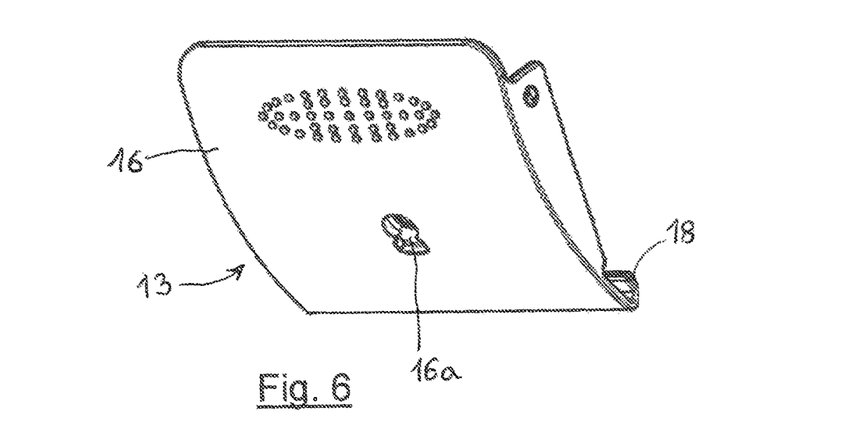
FIG. 6 is a perspective view of the locking element of FIG. 5.

As shown in FIGS. 5 and 6, lever lock 13 comprises an articulated system formed by a first arm 16 pivotally connected to a second arm 17 extending close to one end thereof in a plane substantially perpendicular to the side wall. The opposite end of the first arm is shaped substantially in the form of a hook 18. In the embodiment shown in the figures, first arm 16 is in the form of a plate to afford a comfortable handling and second arm 17 extend from a face and close to a side thereof, and, at the opposite side, a plate lip is bent substantially 180° to the same part of second arm 17 to form hook 18.

Second arm 17 is pivotally connected to first arm 16 and to a base plate 19 fixed, for example through rivets 20, to rounded portion 6c of a side wall of the cabin, the side wall 6 in the example shown in the figures. The axes of the hinges connecting second arm 17 to first arm 16, at one end, and to the base plate 19, at the other one, are perpendicular to the lying plane of second arm 17. Side wall 6 is snap-fit joined to the rounded portion 5c of the side wall adjacent thereto, the wall 5 in the example shown in the figures, through a male-female connection 21, 22 formed along paired vertical edges 5a,b and 6a,b of two side walls 5 and 6.

In particular, the male-female connection comprises a groove 21, which may be continuous or discontinuous, formed along vertical edge 6a of wall 6, and a rib 22, which may be continuous or discontinuous, correspondingly formed along vertical edge 5b of side wall 5 for engaging in groove 21 when side walls 5 and 6 are mounted on platform 3.

Near vertical edge 5b of wall 5, along which rib 22 extends, a recess 23 is formed in the rounded portion 5c outwardly delimited by a tooth 24. Since second arm 17 is pivotable both with respect to plate (i.e., first arm) 16 and to base 19, plate 16 can rotate to engage hook 18 in recess 23 (FIG. 5b) securing it to tooth 24 and can be roto-translated to tighten the connection between hook 18 and tooth 24. Plate 16 has a rounded profile equal to that of the corresponding rounded portion of the side wall which is applied to, whereby, when hook 18 is tightened against tooth 24, plate 16 is substantially flush with side wall 6. To this end, the latter is provided with a seat 25 on its rounded portion 6c, in which base plate 19 is placed and in which second arm 17 is caused to house after a rotation beyond the dead centre of the articulated system (FIG. 5c) in order to stabilize the connection between the two side walls.

Besides allowing for the housing of second arm 17 and plate 16 in such a way that the latter is flush to the surface of rounded portions 5c and 6c of side walls 5 and 6 once they are paired, the dimensions of seat 25 are such that a tooth can be introduced (space 26 of FIG. 5c) to enable the user to lever on plate 16, thus overcoming the resistance of second arm 17 and causing plate 16 to inversely roto-translate and to disengage from tooth 24. In this way, the side walls 5 and 6 can be dismounted, whereby the locking of the joint connection is reversible.

A L-shaped member 27 is provided on the inner face of plate 16 cooperating with a lock, not shown, actuable with a key passing through an opening 16a formed on plate 16 to keep lever lock 13 in its closed condition and prevent opening by unauthorized person.

First arm or plate 16 of lever locks 13 which tighten to each other two by two side wall 4, 5, 6, 7 has a rounded profile because it has to align to the corresponding rounded profile of rounded portions 4c, 5c, 6c, 7c extending from the vertical edges 4a,b, 5a,b, 6a,b, 7a,b of side walls 4-7. Lever locks 14 and 15 intended to connect side walls 4-7 to platform 3 and roof 8, respectively, of cabin 1 have instead a flat linear profile, as the have to align to the flat face of side walls 4-7. Apart from this difference with lever locks 13, lever locks 14 and 15 are structurally and functionally equal to lever locks 13. Therefore, their detailed description is omitted for sake of simplicity and reference is made to FIGS. 7a, b, c and 8, where a lever lock 14 to connect the lower edge of a side wall of the cabin, for example wall 6, to platform 3 is shown, while the lever lock 15 to connect the upper edge of a side wall of the cabin to roof 8 is not shown, for sake of simplicity, because it is fully equal to lever lock 14 shown in FIGS. 7a,b,c and 8 except for, obviously, the overturned arrangement with respect to that shown in said figures.

Figure 7:
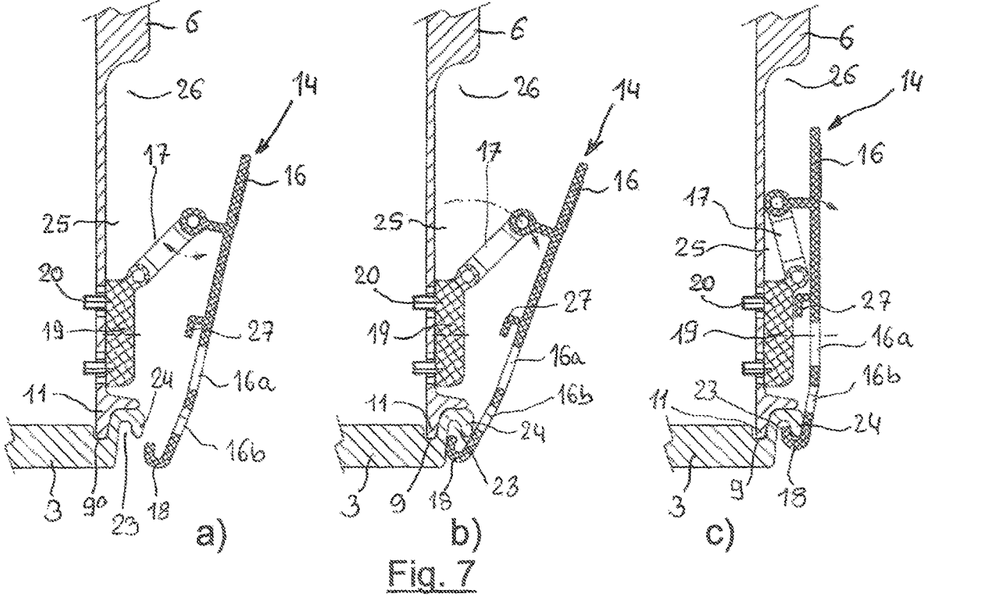
FIG. 7 is a detail view showing a vertical locking element of the connection between a wall and the cabin of FIG. 1 in the a) open, b) hooking and c) closed condition, the vertical locking element between a wall and the cabin roof being equal.
Figure 8:
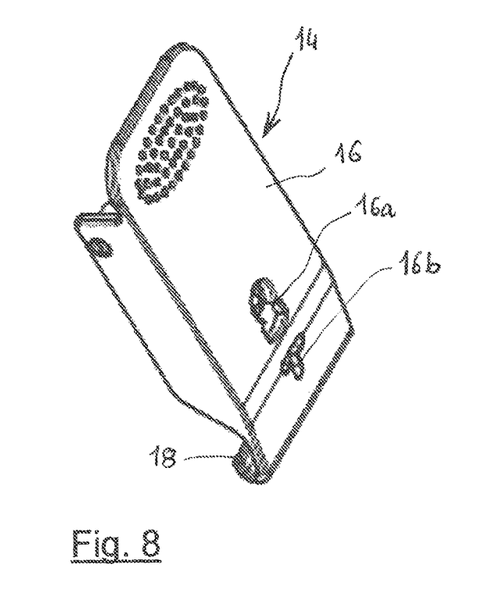
FIG. 8 is a perspective view of the locking element of FIG. 7.

Furthermore, It has to be noted that corresponding components of lever lock 14 shown in FIGS. 7a,b,c and 8 and lever lock 13 shown in FIGS. 5a,b,c and 6 are indicated with the same reference numbers.

It should also be noted that the lever locks 13, 14 and 15 which the chemical toilet cabin is equipped with are fully made of plastic material, for example by moulding. In this way risks of structural stresses are avoided that could occur when different types of material are used (for example, metallic materials for the lever locks) due to different thermal dilatation coefficients. As is known the chemical toilet cabins are subjected, during use, to wide temperature variations which might vary the volume of the components in a different measure, if they are of different materials. From the foregoing, it clearly appears that the chemical toilet cabin according to the invention fully achieves the prefixed objects. In particular, cabin assembling operations are very simple due to the presence of the joint connection means formed by grooves 9, 10 and relevant ribs 11, 12, which ensure an immediate mutual centring of side walls 4, 5, 6, 7 on platform 3 in the correct position, as well as due to the use of joint connection locking means made up of lock levers 13, 14, 15, which allow firmly joining the cabin side walls to each other two by two and each wall to the platform and the roof.

Moreover, it should be noted that cabin assembling is performed without any rivet and relevant tools, such as drills and the like, thus resulting in a higher safety at work for the users.

Figure 9:
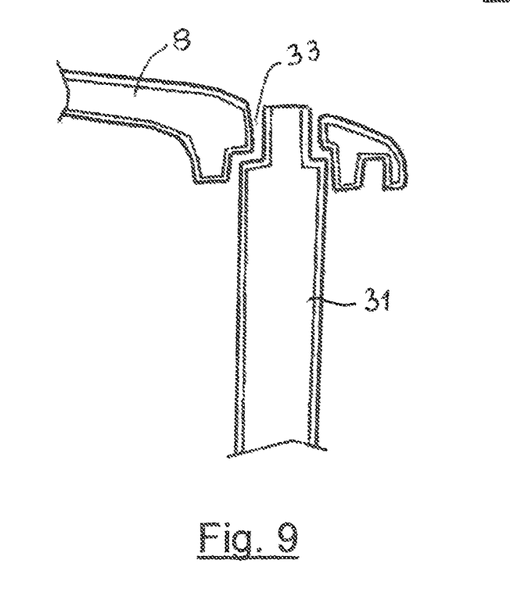
FIG. 9 schematically shows the connection between a tank vent pipe of the chemical toilet cabin and the roof of the cabin.
Figure 10:
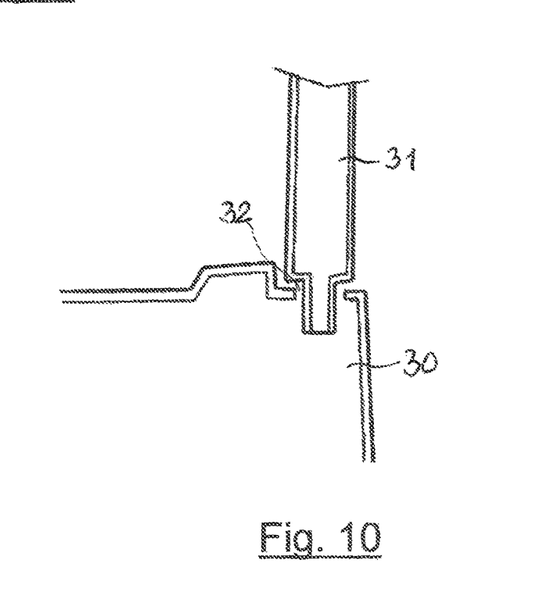
FIG. 10 schematically shows the connection between the tank and the tank vent pipe.

Furthermore, as schematically shown in FIGS. 9 and 10, tank 30 of the chemical toilet cabin is equipped with two vent pipes 31 extending from tank 30 to roof 8, from both sides of we seat and equally spaced therefrom, to convey the exhalations of waste accumulating in the tank to the outside. Vent pipes 31 are airtight engaged in respective through-seats 32 and 33 formed on the tank and the roof and abut against the bottom of the seats, whereby, once walls 4, 5, 6 are locked to platform 3 and roof 8 by lever locks 14 and 15, tank 30 is also stabilized in seat 3a of platform 3. Therefore, vent pipes 31, in addition to the conventional function of conveying waste exhalations from the tank to the outside, also serve to secure the tank within its seat with no need for fastening means (such as screws, bolts, or pins).

Likewise, simple and quick operations are required to dismount the cabin, which, as already said, is not possible with the prior art cabins.

The fact that the chemical toilet cabin of the invention is of the knock-down type results in a further advantage for the operators in that they have to handle significantly lower weights during transport and assembling operations. As a matter of fact, in the prior art already assembled cabins weighing up to 90 kg must be handled, whereas in the case of the present invention the single components have to be handled with maximum weight of a component not higher than 14 kg. To this subject, it should be noted that international regulations relevant to safety and hygiene at work restrict to 25 kg the maximum permissible load that can be lifted by an operator.

The fact that the cabin is of the knock-down type and can be assembled and disassembled directly at the place of use also results in a number of indirect advantages, yet not less important than the ones cited above. In particular, the load capacity of a suitable vehicle being equal, a significantly larger number of cabins can be transported by putting to best use the available loading volume. This results in lower transportation costs, fuel saving and lower pollution. The lower transportation costs allow chemical toilet cabins rental service providers to operate on a wider geographic area at more competitive prices.

Figure 11:
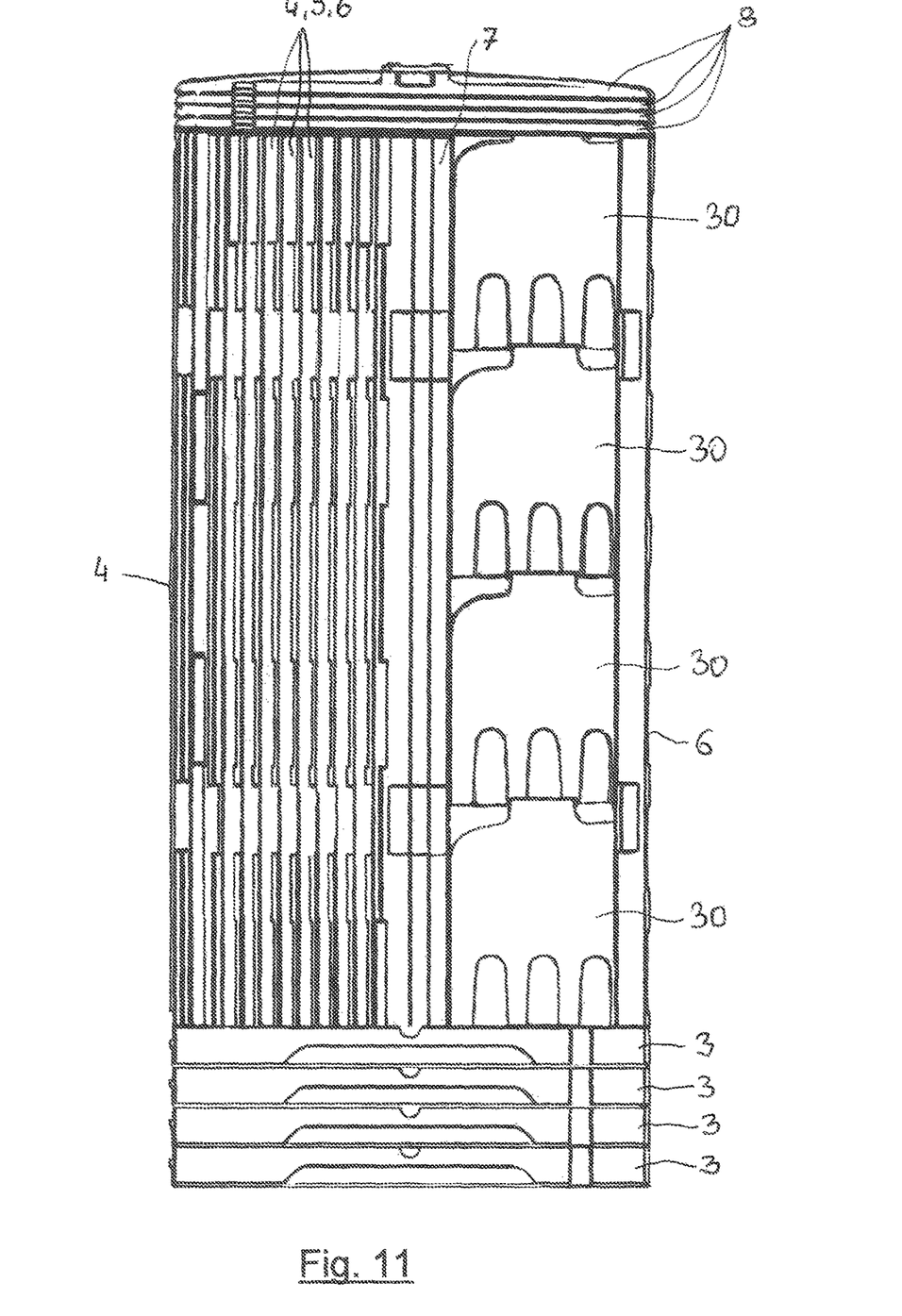
FIG. 11 is a vertical exploded view of four cabins that are dismounted and packaged in a compact form.
Figure 12:
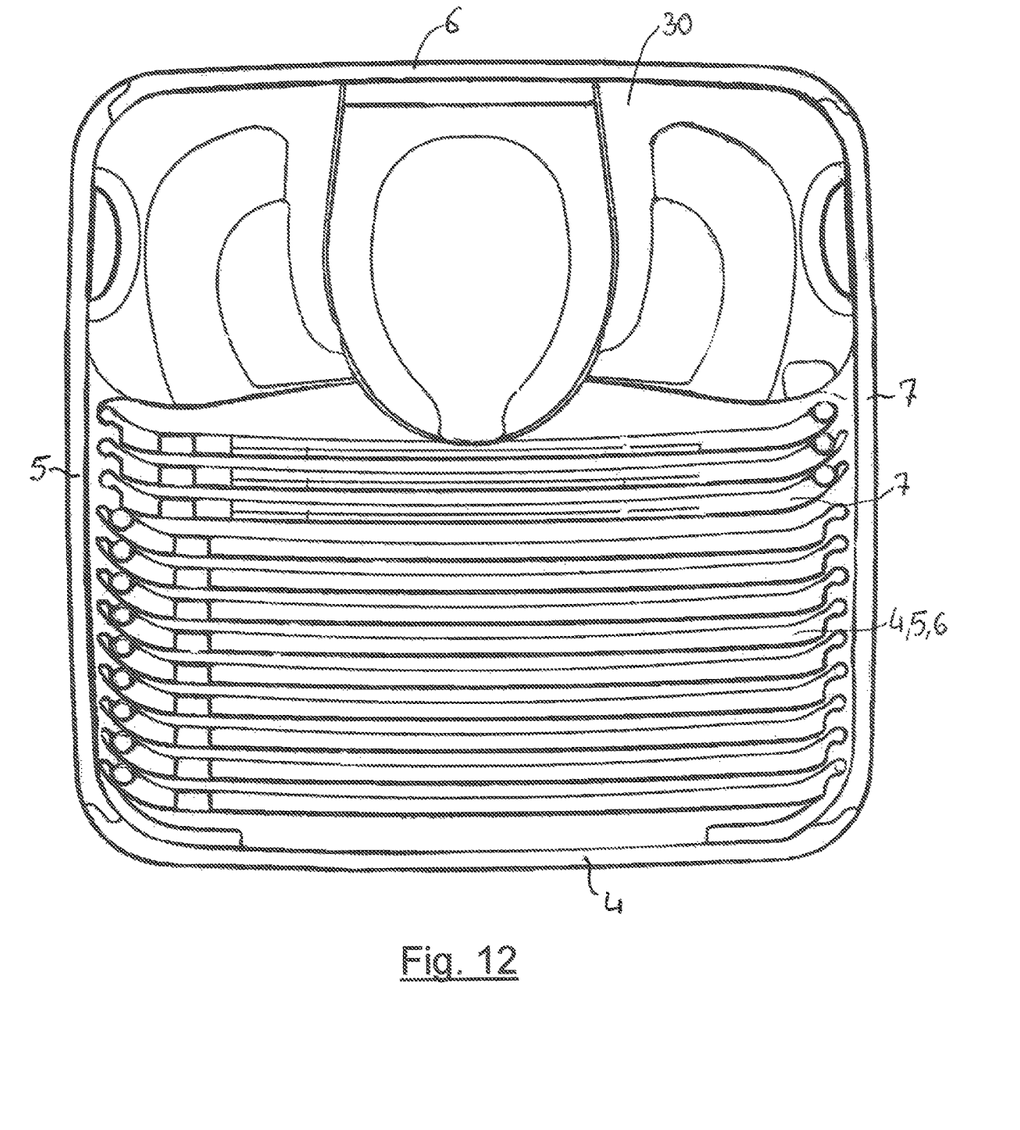
FIG. 12 is a transverse view of the compact package of FIG. 11.

Another advantage of the fact that the cabin is of the knock-down type, and thus of fact that it is the possible to mount and dismount the cabin, is of the hygienic nature. Since tank 30 can be dismounted from walls 4, 5, 6, it is possible to periodically sanitize the parts of the tank surface that, during use, are unreachable and in the prior art cabins are permanently inaccessible as they are riveted together. In a particularly advantageous embodiment of the invention, with reference to FIGS. 11 and 12, the knock-down structure of the cabin according to the invention allows four cabins to be packaged in a compact form in a volume slightly greater than that occupied by a single cabin. As shown in the figures, thanks to a careful selection of the dimensions, in the inner volume of one cabin there can be packed twelve walls of other three equal cabins, i.e., nine walls of the type indicated at 4, 5, 6, and three walls indicated at 7 formed by frame 71 and door 72, and four tanks 30 stacked on one another, the whole being enclosed between four walls 4, 5 6, 7, as well as platform 3 and roof 8 of the outer, container cabin. The three platforms 3 and the three roofs 8 of the remaining three cabins are attached below platform 3 and on roof 8 of the mounted outer cabin. Side walls of the latter are locked to each other through lever locks 13, while platforms 3 and roofs 8 are secured to walls 4, 5, 6, 7 through lever locks 14 and 15 by using extensions, not shown, engaging with substantially T-shaped openings 16b formed on plates 16 of lever locks 14 and 15 (see FIGS. 7 and 8).

The above described packaging assembly is especially advantageous for dispatching new products from the manufacturing place to warehouses of the service providers (even if, obviously, it may be not limited to this use). On the other side, the advantage of this packaging structure is not limited to that described above. In fact, the user might consider to rearrange four dismounted cabins in the above described configuration after an use. In this way the need for a storage space for the cabins will be reduced to one quarter while waiting for a new destination. Also, re-packaging four cabins into one cabin after an use and waiting for the next one, prevents three out of four cabins from being exposed to solar irradiation, this resulting in a clear advantage from the point of view of the cabin lifetime.

Figure 13:
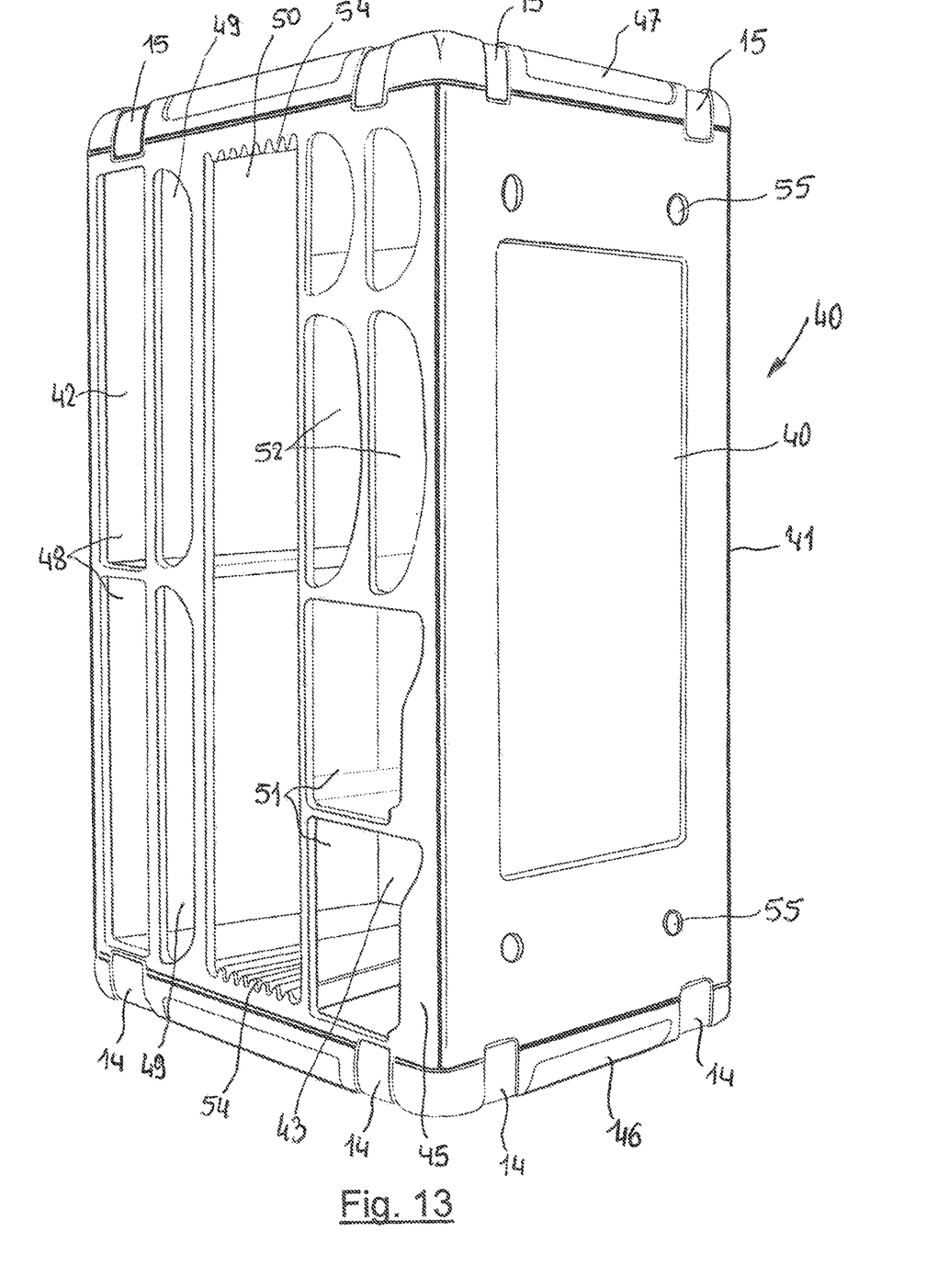
FIG. 13 shows a container for a pair of cabins according to invention.

To dispatch dismounted cabins during their normal use the container shown in FIG. 13, generally indicated at 40, may be used with significant convenience.

Container 40 comprises a substantially box-shaped body 41 formed by four side walls 42, 43, 44, 45 and two equal bases, lower basis 46 and upper basis 47, joined to one another by the above described lever locks 14 and 15. Three side wall are equal to each other, while the forth one (wall 47 in the example shown in FIG. 13) is formed with shaped openings to allow the components of two cabins to be placed therein. In particular, with reference to FIG. 13 and starting from left side to right side in the figure, there are provided two openings 48 for two platforms, two openings 49 for two roofs, an opening 50 for eight walls of two cabins, two opening 51 for two tanks, two openings 52 for two hand basins and two openings 53 for two urinals.

Inside body 41 there are provided shelves attached to the side walls for supporting the various components; in particular, grooved holding plates 54 are provided in the space delimited by opening 50 on bases 46 and 47 to engage the edges of the walls of the two cabins, thus preventing possible transverse movements of said walls.

In one embodiment, multiple containers 40 may be provided and to this end they can be joined together through their side walls by means of suitable connection members engaged within aligned through-holes 55 formed on mating walls of two containers 40 placed side by side.

The container 40 for dismounted cabins of FIG. 13 advantageously allows the operator to orderly place the various components of the cabin at the time of its dismounting and to find them handy immediately when the cabin has to be assembled again. This results in a considerable time saving when the cabin has to be mounted and dismounted.

Finally, it should not be overlooked the fact that the chemical toilet cabin according to the invention, thanks to its knock-down structure, has an attractive shape with rounded edges, without any surface unevenness and without any exposed metallic part, which unavoidably would undergo oxidation over time.

It is finally pointed out that, in the present description, the terms horizontal and vertical, inner and outer, upper and lower, adjacent and consecutive, and the like have to be meant with reference to the cabin as mounted and in its use attitude, such as that shown in FIG. 1. In particular, "vertical" sides or edges of the side walls are the sides or edges through which a wall is connected to the adjacent one, while "upper" and "lower" sides or edges of the side walls are the sides or edges through which a wall is connected to the roof and the platform, respectively.

Variations and/or modifications may be brought to the chemical toilet cabin according to the present invention without departing from the scope of the invention as defined in the following claims.

The invention claimed is:

1. A chemical toilet cabin comprising:
a platform, vertical side walls, and a roof,
reversible joint connection means formed along edges of said side walls and on opposed faces of said platform and said roof to removably join each side wall to adjacent side walls, to the platform and to the roof,
reversible locking means of said joint connection arranged between a side wall and the adjacent wall and between each of said side walls and said platform and said roof,
wherein
said side walls have vertical edges and side wall portions adjacent to said vertical edges that are rounded in such a way to form a rounded edge of the cabin when two side walls are paired to each other;
vertical edges delimiting said rounded portions of said vertical walls are shaped with matching male-female profile between a wall and the adjacent wall making up said joint connection means between adjacent walls;
each of said reversible locking means of said joint connection means provided between two adjacent side walls comprises a lever lock comprising an articulated system formed by a first arm with a hook-shaped end and a second arm lying in a plane perpendicular to said two adjacent side walls and pivotally connected to said first arm and to a rounded portion of one of said adjacent side walls about axes perpendicular to said plane;
the hook-shaped end of said first arm being engaged with a tooth formed on a rounded portion of the other of said two adjacent side walls in a tightened condition when said second arm is rotated beyond a dead centre of said articulated system.

2. The chemical toilet cabin according to claim 1, wherein said first arm has a same rounded profile of the rounded portions of said side walls, and a seat is formed on the rounded portion of each side wall for housing said first arm and said second arm, when said hook-shaped end is tightened against said tooth, in such a way that said first arm is substantially flush with an outer face of a respective rounded portion and in such a way to contain said second arm rotated beyond said dead centre of said articulated system.

3. The chemical toilet cabin according to claim 1, wherein said reversible joint connection means comprise grooves, perimetrically formed along inner faces of said platform and said roof, and ribs formed along corresponding lower and upper edges of said side walls for removably engaging within said grooves, said matching male-female profiles between a wall and the adjacent wall comprising further grooves and ribs formed along vertical walls of said side walls adapted to mutually engage for removably joining a side wall to the adjacent wall.

4. The chemical toilet cabin according to claim 1, wherein said reversible locking means of the joint connections arranged among said side walls and said platform and said roof comprise lever locks formed by a first arm and a second arm pivotally connected to each other and said side walls near said lower and upper edges, with hinge axes perpendicular to the lying plane of said second arm, said axis being perpendicular to the respective side wall, and hook means correspondingly formed on said side walls, said platform and said roof.

5. The chemical toilet cabin according to claim 1, wherein said first arm of said lever locks is formed by a plate pivotally connected to said second arm, which, in turn, is pivotally connected to said side wall and lying in a plane substantially perpendicular to said side wall.

6. The chemical toilet cabin according to claim 5, wherein said hook is formed by a lip of said plate bent towards said second arm.

7. The chemical toilet cabin according to claim 1, wherein said platform comprises a seat for housing a bottom of a waste tank and two vent pipes extend from said tank to said roof abutting against said seat and into communication with the outside, whereby, upon tightening said reversible joint connections locking means, said vent pipes are forced between said roof and said tank, thus locking said tank in said seat.

8. The chemical toilet cabin according to claim 1, wherein three additional cabins are arranged therein in a dismounted state, in an inner volume of said cabin twelve walls of other three equal cabins being packed and four tanks being arranged on one another, the cabin and additional cabins being enclosed among said four side walls, said platform and said roof of said outer roof serving as container, the three platforms and the three roofs of the remaining cabins being attached below said platform and on said roof of the cabin, thereby making a packaging formed by overall four cabins.

9. The chemical toilet cabin according to claim 8, wherein the side walls are fastened to each other by said lever locks, while platforms and roofs are fastened to said walls through lever locks using extensions engaging with substantially T-shaped openings formed on.

10. A container for housing and transporting two chemical toilets cabins according to claim 1, wherein in a dismounted state, the container comprises a substantially box-shaped body defining a plurality of spaces for orderly holding at least the walls, the platforms, the roofs, the tanks, handwashes and the urinals of said two cabins, a wall of the body being formed with an opening for component positioning within said container.

11. The container according to claim 10, comprising connection means on the side walls for joining said container with at least one additional equal container.

* * * * *